F. E. CULVER.
MULTIPLE MICROMETER.
APPLICATION FILED MAY 13, 1918.
1,291,771. Patented Jan. 21, 1919.
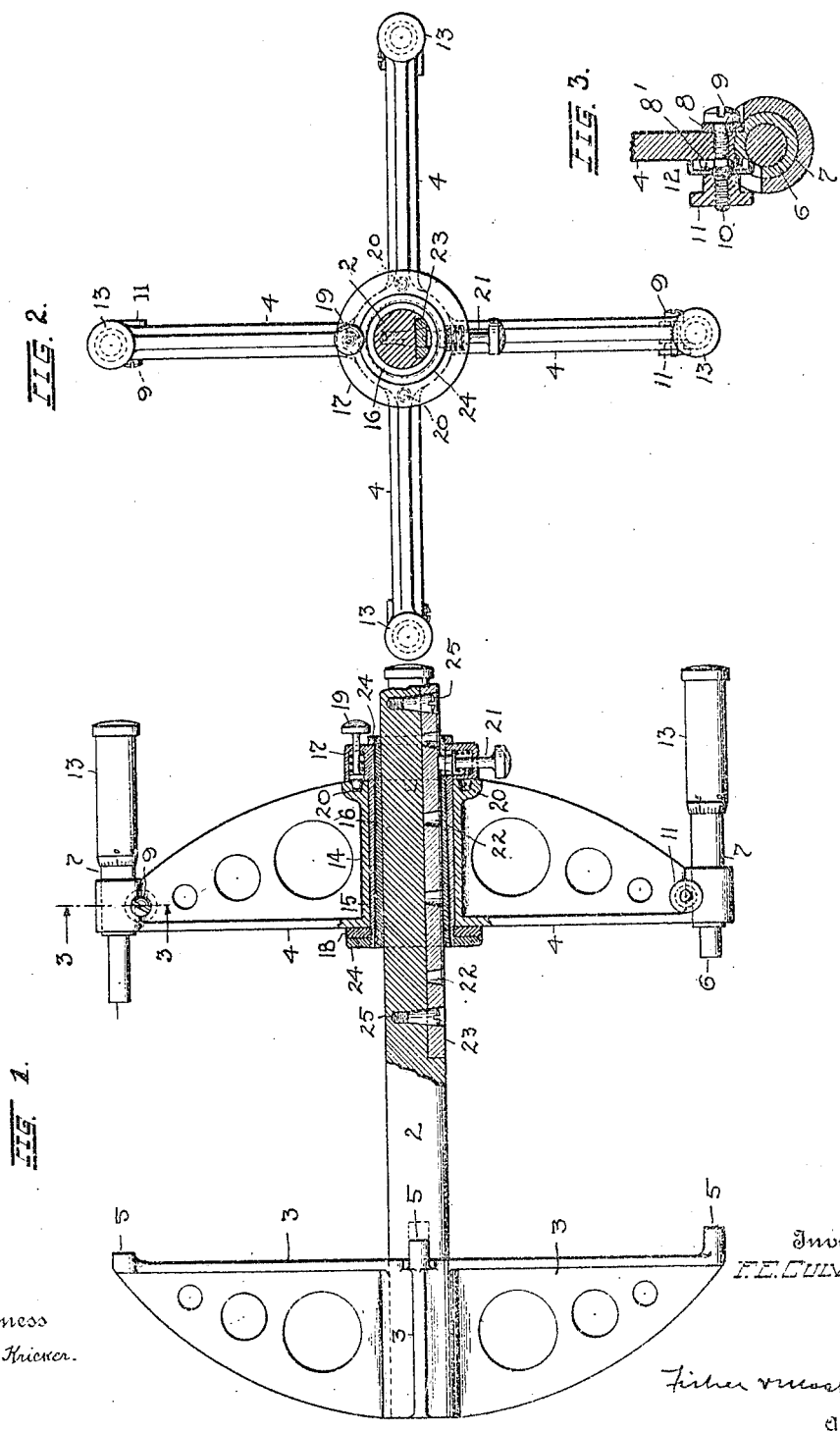
Witness
Geo. E. Kricker.
Inventor
F. E. Culver.
Attorneys

UNITED STATES PATENT OFFICE.

FRED E. CULVER, OF CLEVELAND, OHIO.

MULTIPLE MICROMETER.

1,291,771.     Specification of Letters Patent.     Patented Jan. 21, 1919.

Application filed May 13, 1918. Serial No. 234,038.

*To all whom it may concern:*

Be it known that I, FRED E. CULVER, a citizen of the United States, residing at Cleveland, in the county of Cuyahoga and State of Ohio, have invented certain new and useful Improvements in Multiple Micrometers, of which the following is a specification.

My invention relates to a multiple caliper gage, the object being to provide an adjustable frame and a rotatable mounting for a multiple number of micrometer screws, whereby a multiple number of exact measurements may be made on any given piece of work in a very brief interval of time.

In the accompanying drawing, Figure 1 is a side view, partly in section, of my improved caliper gage, and Fig. 2 is an end view thereof. Fig. 3 is a cross section of one of the bearings for the micrometer screws and the parts therewith on line 3, 3 Fig. 1. The invention comprises a shaft 2 having a set of arms 3 stationed at one end thereof and a second set of arms 4 rotatably and slidably mounted thereon opposite the first set of arms. The stationary arms 3 are provided with anvils 5 of varying length, while the movable arms 4 are equipped with independent micrometer screws 6 which may be adjusted and set for exact measurement at different distances from the anvils 5. The barrel 7 which incases each micrometer screw or spindle 6 is removably confined within a cylindrical bore in the outer end of each arm 4 and clamped or locked therein by a washer 8 placed beneath the head 9 of a screw 10 which extends transversely through the arm, and the screw has a lock nut 8' also bearing against barrel 7. Each micrometer spindle 6 is also adapted to be locked against rotation by a thumb-nut 11 and a second larger washer 12 sleeved over the stem of the screw 10 in bearing engagement with the side of the micrometer spindle 6, (see Fig. 3). Barrel 7 may be held against rotation by lock washer 8 and the spindle 6 unlocked for rotation by retiring the thumb-nut 11, and rotation of the spindle is obtained in the usual way through a thimble 13.

Arms 4 are integral with a cylindrical hub 14, which is mounted to rotate on a slidable support comprising an outer sleeve 15 and a tapered inner sleeve 16. Outer sleeve 15 has an annular enlargement 17 bearing against one end of hub 14 and the opposite end is engaged by a nut 18 and a lock nut 24 screwed upon the sleeve 15. A spring-pressed latch 19 extends through enlargement 17 and is adapted to enter openings 20 in the hub to lock the hub and arms against rotation on sleeve 15, and the two sleeves are prevented from rotating about the shaft by a spring-pressed locking plunger 21 which is adapted to enter any one of a row of openings 22 in a bar 23 which is inset in one side of shaft 2. The two sleeves 15 and 16 are in wedging relation and the inner sleeve has a nut 24' at its smaller end to lock the outer sleeve in place thereon and to take up wear. The separate bar 23 is held removably within the recessed side of shaft 2 by screws or dowel pins 25 and its outer face may be provided with a shallow groove lengthwise to seat the locking extremity of plunger 21. Withdrawal of this plunger from the tapered openings 22 permits adjustment and a new setting of the arms 4 longitudinally of shaft 2, while withdrawal of latch 19 permits the hub and arms 4 to be rotated to establish a different setting of the micrometer screws or spindles 6 opposite anvils 5. Two or more arms 4 may be used, and four are shown as equipped with micrometer screws, and each screw may be set at a different distance from a given anvil so that when the arms 4 are jointly rotated step by step to position opposite that anvil different measurements may be taken. Furthermore, as the several anvils 5 are of different lengths, a variety of measurements may be taken without rotating arms 4, and taking all the anvils into consideration a still greater number of measurements may be taken by rotating the arms and bringing each micrometer screw opposite each anvil in turn.

What I claim is:

1. A micrometer gage having an anvil and a multiple number of micrometer screws having rotatable mountings adapting each screw to be placed opposite said anvil in succession and a centrally disposed shaft on which said parts are mounted.

2. A micrometer gage having a shaft and a slidable and rotatable mounting thereon provided with a multiple number of micrometer screws.

3. A multiple caliper gage, comprising a shaft and a stationary anvil thereon, a multiple number of micrometer screws and a rotatable mounting for said screws opposite said anvil.

4. A multiple caliper gage, comprising a shaft having opposing sets of arms thereon, and a multiple number of micrometer screws secured upon one set of arms and coöperating each with an opposing arm.

5. A multiple caliper gage, comprising a shaft having a set of fixed arms, a slide on said shaft, a hub rotatably mounted on said slide and having a set of arms, and micrometer screws secured upon one of said sets of arms and coöperating each with an opposing arm.

6. A multiple caliper gage, comprising a shaft and a plurality of arms on said shaft having anvils, a rotatable mounting having a plurality of micrometer screws removably fixed thereon, and means to adjustably fix said mounting and screws relatively nearer or farther from said anvils.

7. A multiple caliper gage, comprising a shaft having an arm provided with an anvil, a sleeve longitudinally adjustable on said shaft, a hub rotatably mounted upon said sleeve, and arms on said hub having micrometer screws adapted to be placed opposite said anvil.

8. In a multiple micrometer gage, a shaft, a set of sleeves in wedging relation on said shaft, a hub rotatably mounted upon said sleeves, radially disposed arms mounted on said hub and a set of micrometer screws carried by said arms.

9. In a multiple micrometer gage, a shaft having an inset member provided with openings, a sleeve having a locking device adapted to enter said openings, a rotatable mounting upon said sleeve, and a plurality of micrometer screws carried by said mounting.

10. In a micrometer gage, a supporting arm having a cylindrical bore, a micrometer barrel in said bore, a screw and clamping washer upon said arm and in locking relation with said barrel, a micrometer screw within said barrel, and a thumb-nut and clamping washer in locking relation with said micrometer screw.

11. In a multiple micrometer gage, a shaft having a set of arms fixed thereon and an anvil on each arm, a plurality of sleeves slidably mounted upon said shaft and a lock nut therefor, a locking device for said sleeves, a hub rotatably mounted upon said sleeves, and a locking device for said hub, arms disposed about said hub and separate micrometer screws removably secured upon said last named arms.

12. A multiple caliper gage, comprising a cylindrical shaft provided with a longitudinal groove, a bar set into said groove flush with the surface of said shaft and provided with openings, and a slidable support thereon for a set of micrometer screws having a locking device adapted to enter said openings.

13. A multiple caliper gage, comprising a shaft, tapered sleeves socketed together in slidable position upon said shaft, a nut to adjust the sleeves longitudinally in respect to each other, means to lock the sleeves jointly upon the shaft, a hub rotatably mounted upon said sleeves having micrometer devices secured at different radial places thereon, and means to lock said hub against rotation.

14. A multiple caliper gage, comprising a shaft having radial arms thereon provided with anvils of different length, and a rotatable mounting on said shaft having a micrometer device adapted to be placed opposite each anvil upon rotation of said mounting.

Signed at Cleveland, in the county of Cuyahoga, and State of Ohio, this 4th day of May, 1918.

FRED E. CULVER.

Copies of this patent may be obtained for five cents each, by addressing the "Commissioner of Patents, Washington, D. C."